Jan. 17, 1967 H. A. CLAY 3,299,162
PRODUCTION OF ISOPRENE AND 3-METHYL-1-BUTENE
Filed Dec. 26, 1963
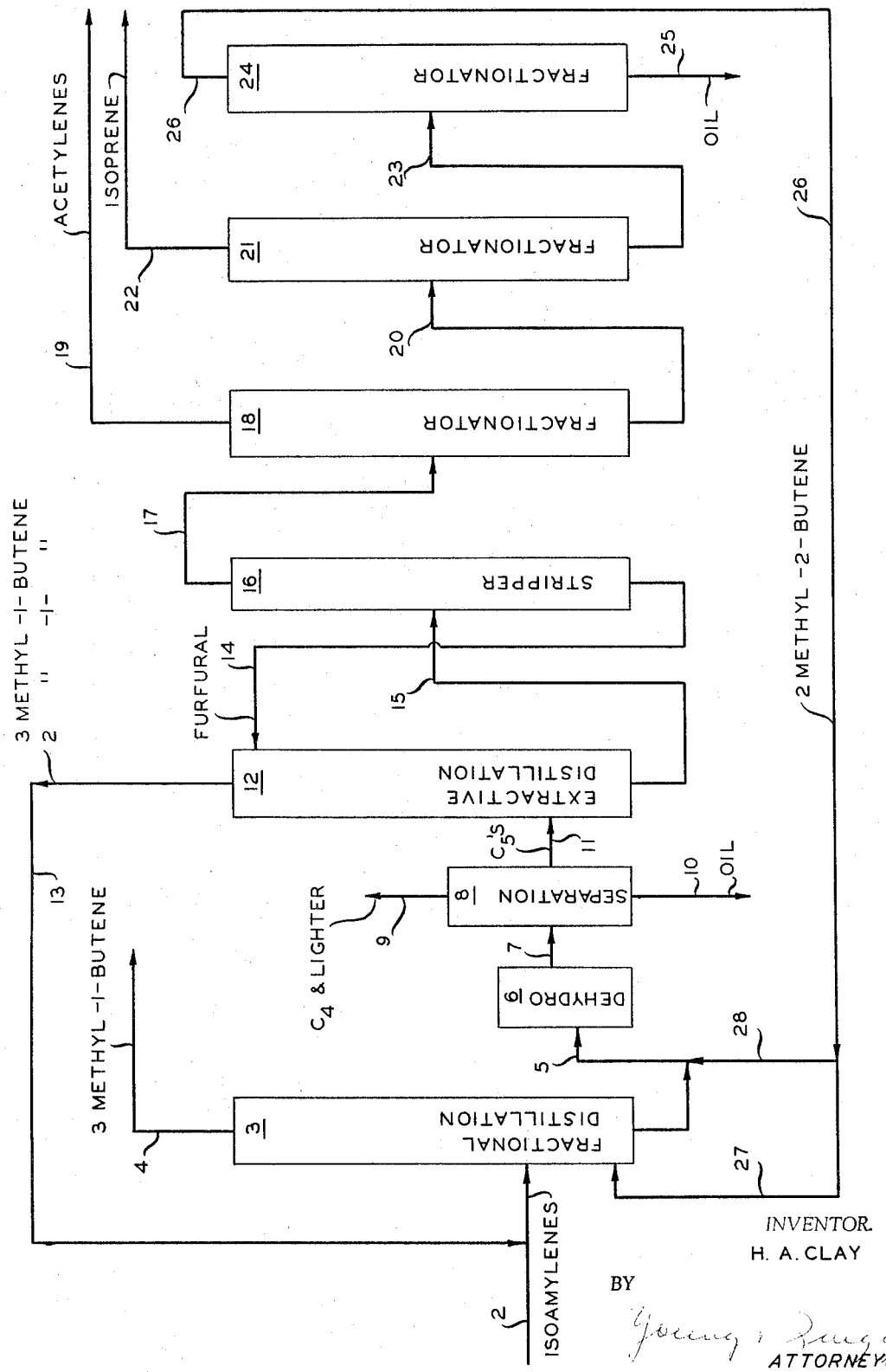
INVENTOR.
H. A. CLAY United States Patent Office 3,299,162
Patented Jan. 17, 1967

3,299,162
PRODUCTION OF ISOPRENE AND
3-METHYL-1-BUTENE
Harris A. Clay, Bartlesville, Okla., assignor to Phillips Petroleum Company, a corporation of Delaware
Filed Dec. 26, 1963, Ser. No. 333,485
4 Claims. (Cl. 260—680)

This invention relates to a method for the production of 3-methyl-1-butene and isoprene. In one of its aspects, the invention relates to a combination of steps for the production of 3-methyl-1-butene and isoprene from an isoamylenes-containing stream from which 3-methyl-1-butene is separated prior to treating said stream by dehydrogenation, the dehydrogenated stream being treated to separate therefrom isoprene and additional quantities of 3-methyl-1-butene, and, as desired, 2-methyl-1-butene, which is returned to the initial separation of 3-methyl-1-butene, thus obtaining a method of control within certain limits of the yield per pass of the two products whereby each yield can be controlled substantially independently, as later described herein.

Both 3-methyl-1-butene and isoprene are well known, important organic chemical compounds, the uses of which are well known and understood.

I have now conceived of a combination of steps which permits the separation of 3-methyl-1-butene from an isoamylenes stream and from the effluent resulting from a dehydrogenation of the remainder of such a stream so that 3-methyl-1-butene is essentially recovered independently from steps involving the treatment of streams containing isoprene which result after the removal of the 3-methyl-1-butene.

It is an object of this invention to provide a method for the production of 3-methyl-1-butene. It is another object of this invention to provide a method for the production of isoprene. It is a further object of this invention to provide a combination of steps permitting the treatment of a stream of isoamylenes to produce, with a good measure of independent control, 3-methyl-1-butene on the one hand and isoprene on the other as products of the operation.

Other aspects, objects and the several advantages of this invention are apparent from a consideration of this disclosure, the drawing, and the appended claims.

According to the invention, there is provided a method for the production of 3-methyl-1-butene and isoprene which comprises in a fractional distillation zone fractionally distilling an isoamylenes feed stock containing 3-methyl-1-butene, 2-methyl-1-butene and 2-methyl-2-butene, recovering overhead said 3-methyl-1-butene as a product of the process, passing at least a portion of the remainder of said feed stock to a dehydrogenation zone wherein isoprene, 3-methyl-1-butene, acetylenes and some oil are formed, extractively distilling the C₅ fraction of the dehydrogenation zone effluent, obtaining and passing to said fractional distillation zone an extractive distillation zone overhead fraction containing 2-methyl-1-butene and 3-methyl-1-butene, obtaining a bottoms fraction from said extractive distillation zone and subjecting the same to treatment to recover isoprene therefrom.

Still further according to the invention, the extractive distillation zone bottoms fraction obtained as described is treated to recover therefrom an acetylenes-containing stream and a stream containing isoprene and 2-methyl-2-butene, the isoprene-containing stream being then treated to separate the isoprene, the 2-methyl-2-butene being returned to the fractional distillation zone or to the dehydrogenation zone, as desired.

Referring now to the drawing, which diagrammatically illustrates an operation according to the invention, isoamylenes, having an approximate analysis as given in Table II, enter at 2 into fractional distillation zone 3, overhead 4 from which is a 3-methyl-1-butene containing stream, the bottoms of which are passed by 5 into dehydrogenation or catalytic reaction zone 6, such as described in U.S. Patent 2,982,795, issued May 2, 1961, to J. R. Owen, wherein isoamylenes are converted. Effluent from zone 6 is passed by 7 to separator 8 from which an overhead 9 containing $C_4$ and lighter compounds is separated while a heavier than $C_5$'s fraction or oil is withdrawn at 10. The converted $C_5$'s stream passes by 11 to extractive distillation tower 12 the overhead from which consists chiefly of 3-methyl-1-butene newly formed in dehydrogenation zone 6 and 2-methyl-1-butene returned by 13 and 2 to fractional distillation 3. In the event that the ratio of 3-methyl-1-butene to 2-methyl-1-butene in conduit 13 is substantially different from that in feed stream 2, stream 13 may be fed to fractionator 3 at a level different from conduit 2; that is, if this ratio is greater than that in the feed, line 13 will enter column 3 separately from and above conduit 2. The returned 3-methyl-1-butene leaves at 4 together with 3-methyl-1-butene originally contained in the feed. The extractive distillation is conducted with the aid of a solvent selective to the separation of isoprene, 2-methyl-2-butene, acetylenes and heavier materials from 3-methyl-1-butene and 2-methyl-1-butene, for example, a selective solvent such as furfural introduced at 14 into tower 12. The rich solvent bottoms product from tower 12 passes by 15 to stripper 16, a bottoms solvent stream from which after suitable cooling is returned by 14 to tower 12 while overhead 17 is passed to fractionator 18, the overhead from which is an acetylenes containing stream 19 which is removed from the operation. From fractionator 18, bottoms 20 are passed to fractionator 21, from which overhead 22 is removed as the isoprene product of the operation while bottoms 23 are passed to fractionator 24, separating out an oil bottoms product 25 while obtaining overhead 26, which is a vaporized 2-methyl-2-butene containing stream which, by proper column pressure levels, is sufficiently hot so that it can be passed to the lower portion of fractionation zone 3 by way of 27, thus furnishing a part of the reboiling vapor to fractionation zone 3, or a portion thereof, as may be desired, may be passed by 28 and 5 to dehydrogenation zone 6, also without being previously condensed.

Conditions of temperature and pressure for an operation of the specific embodiment here described are given in Table I below.

TABLE I

| Column No. | 3 | 12 | 16 | 18 | 21 | 24 |
|---|---|---|---|---|---|---|
| Overhead pressure, p.s.i.a. | 27 | 40 | 20 | 20 | 18 | 40 |
| Temperatures, °F.: | | | | | | |
| Overhead | 108 | 140 | 110 | 110 | 107 | 162 |
| Bottoms | 134 | 240 | 285 | 123 | 122 | 206 |

Frequently, isoamylenes are recovered, from the $C_5$ hydrocarbon fraction produced in catalytic cracking of oils, by sulfuric acid extraction. Alternatively, high purity isopentane may be dehydrogenated and the isoamylenes recovered.

The composition of the isoamylenes feed can and will vary depending upon its source. Representative feeds from each source will have substantially the following approximate analyses in mol percent.

TABLE II

| Compound | From cat. cracked C₅ fraction | From isopentane dehydrogenation |
|---|---|---|
| 3-methyl-1-butene | 6 | 12 |
| 2-methyl-1-butene | 34 | 30 |
| 2-methyl-2-butene | 55 | 53 |
| Paraffin hydrocarbons | 5 | 5 |
| Total | 100 | 100 |

Solvents which may be employed in lieu of the preferred solvent, furfural, are: ethylene glycol, methyl carbitol, methyl Cellosolve, and other semi-polar, relatively non-volatile compounds. The chosen solvent may have its solvent and volatility properties modified by addition of other materials. For example, in practice, solvent furfural usually contains moderate concentrations of water, process-system "oils" and traces of anti-foam agents.

Dehydrogenation zone 6 and separation zone 8, being conventional in nature, can be operated at conditions well within the skill of the art.

One skilled in the art in possession of this disclosure, upon study of the same, will recognize that there has been set forth an arrangement or combination of steps of operation or processing leading to an advantageous recovery of 3-methyl-1-butene on the one hand and isoprene on the other from an isoamylenes feed stock. This process also permits, within certain limits, the yield per pass of these two products to be controlled independently, since within reaction zone 6 the competing isoamylene reactions, by dehydrogenation to isoprene and by isomerization to 3-methyl-1-butene, may be manipulated by varying the 3-methyl-1-butene concentration in stream 5 and consequently its recovery as stream 4. This is highly advantageous since a minor amount of 3-methyl-1-butene is an important material for such use as in the production of solid polymers or copolymers with ethylene, propylene and other olefins. One skilled in the art knows that a catalyst used for the production of isoprene from isoamylenes tends also to isomerize the isoamylenes to form equilibrium amounts of the methyl butene isomers, thus producing 3-methyl-1-butene.

Reasonable variation and modification are possible within the scope of the foregoing disclosure, drawing and the appended claims to the invention the essence of which is that there has been provided a method for the treatment of an isoamylenes feed, for example as herein described, to essentially recover 3-methyl-1-butene therefrom, to thereafter catalytically convert the remainder of said isoamylenes stream to an isoprene and methyl butenes containing stream from which 3-methyl-1-butene is separated and recovered, and following which isoprene is recovered substantially as set forth and described herein; 2-methyl-1-butene being recovered together with the catalytically generated 3-methyl-1-butene, and the 2-methyl-2-butene being recovered after a separation of it and isoprene from a stream resulting from the separation of said 3-methyl-1-butene and 2-methyl-1-butene, also as set forth and described herein.

I claim:

1. A method for the production of 3-methyl-1-butene and isoprene which comprises in a fractional distillation zone fractionally distilling an isoamylenes feed stock containing 3-methyl-1-butene, 2-methyl-1-butene and 2-methyl-2-butene, recovering overhead said 3-methyl-1-butene as a product of the process, passing at least a portion of the remainder of said feed stock to a dehydrogenation zone wherein isoprene, 3-methyl-1-butene, acetylenes and some oil are formed, extractively distilling the dehydrogenation zone effluent, obtaining and passing to said fractional distillation zone an extractive distillation overhead containing 2-methyl-1-butene and 3-methyl-1-butene, obtaining a bottoms fraction from said extractive distillation and subjecting the same to treatment to recover isoprene therefrom.

2. A method according to claim 1 wherein the bottoms fraction is treated to recover an acetylenes-containing stream and a stream containing isoprene and 2-methyl-2-butene and wherein the last-mentioned stream is treated to recover 2-methyl-2-butene which is passed to said fractional distillation zone and the isoprene is recovered as a product.

3. A method according to claim 2 wherein the isoprene is separated from the last-mentioned stream and wherein oils in the fraction remaining after the isoprene has been separated are separated from still remaining 2-methyl-2-butene before it is passed to said fractional distillation zone.

4. A method according to claim 1 wherein the extractive distillation zone is operated with a solvent possessing the selective solvent characteristics of furfural.

No references cited.

DELBERT E. GANTZ, *Primary Examiner.*

G. E. SCHMITKONS, *Assistant Examiner.*